US007707500B2

(12) United States Patent
Martinez

(10) Patent No.: US 7,707,500 B2
(45) Date of Patent: Apr. 27, 2010

(54) USER INTERFACE FOR MEDIA ITEM PORTION SEARCH TOOL

(75) Inventor: Ronald Martinez, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 356 days.

(21) Appl. No.: 11/292,034

(22) Filed: Nov. 30, 2005

(65) Prior Publication Data

US 2007/0083496 A1 Apr. 12, 2007

Related U.S. Application Data

(63) Continuation-in-part of application No. 11/247,015, filed on Oct. 10, 2005, which is a continuation-in-part of application No. 11/247,562, filed on Oct. 10, 2005.

(51) Int. Cl.
*G06F 3/00* (2006.01)
*G06F 17/30* (2006.01)
*G06Q 30/00* (2006.01)

(52) U.S. Cl. .................. 715/717; 715/723; 715/727; 715/968; 705/26; 707/7

(58) Field of Classification Search .......... 715/716–717, 715/792, 968, 723–725, 727; 707/7, 102; 705/26, 27

See application file for complete search history.

(56) References Cited

U.S. PATENT DOCUMENTS

| | | | |
|---|---|---|---|
| 5,493,677 A * | 2/1996 | Balogh et al. ............ 707/104.1 |
| 5,832,501 A * | 11/1998 | Kain et al. ............... 707/103 R |
| 6,119,229 A | 9/2000 | Martinez et al. |
| 6,138,119 A | 10/2000 | Hall et al. |
| 6,549,922 B1 | 4/2003 | Srivastava et al. |
| 6,587,837 B1 | 7/2003 | Spagna et al. |
| 6,718,308 B1 * | 4/2004 | Nolting ....................... 704/275 |
| 6,928,423 B1 | 8/2005 | Yamanaka |
| 6,944,612 B2 * | 9/2005 | Roustant et al. ................ 707/3 |
| 2001/0014882 A1 * | 8/2001 | Stefik et al. .................... 705/51 |
| 2003/0120928 A1 | 6/2003 | Cato et al. |
| 2003/0135464 A1 * | 7/2003 | Mourad et al. ................ 705/50 |
| 2003/0174861 A1 | 9/2003 | Levy et al. |
| 2004/0064692 A1 | 4/2004 | Kahn et al. |
| 2004/0181487 A1 | 9/2004 | Hanson |

(Continued)

OTHER PUBLICATIONS

Miser et al., "iPod + iTunes Starter Kit", published by Que, First printing Oct. 2004, copyright 2005 Que Publishing.*
Notification of Transmittal of the International Search Report and the Written Opinion of the International Searching Authority or the Declaration dated Apr. 22, 2008 (PCT/US06/37908).
Notification of Transmittal of the International Search Report And The Written Opinion of The International Searching Authority, Or The Declaration (PCT/US06/037907).

*Primary Examiner*—William L Bashore
*Assistant Examiner*—Andrew Tank
(74) *Attorney, Agent, or Firm*—James J. DeCarlo; Greenberg Traurig, LLP

(57) ABSTRACT

A user interface for accessing and utilizing a media item portion database. In one aspect, the database entry comprises a data container. In another aspect, the media item portion entries may be used to identify media item portions used in creating composite media items.

46 Claims, 9 Drawing Sheets

U.S. PATENT DOCUMENTS

| | | |
|---|---|---|
| 2004/0199471 A1 | 10/2004 | Hardjono |
| 2004/0267552 A1 | 12/2004 | Gilliam et al. |
| 2005/0065912 A1 | 3/2005 | Cafrelli et al. |
| 2005/0108770 A1 | 5/2005 | Karaoguz et al. |
| 2005/0119976 A1 | 6/2005 | Taylor et al. |
| 2005/0192871 A1 | 9/2005 | Galuten et al. |
| 2006/0190290 A1 | 8/2006 | Gomez |
| 2007/0067427 A1* | 3/2007 | Bugir et al. .................. 709/223 |

* cited by examiner

Expanded Browse Categories

```
600                                                                                                617
  <rdf:RDF xmlns="http://web.resource.org/cc/" xmlns:dc="http://purl.org/dc/elements/1.1/" xmlns:rdf="http:/
  www.w3.org/1999/02/22-rdf-syntax-ns#">
602——▶ <Work rdf:about="">
  603——▶ <dc:title>Eiffel Tower - Paris</dc:title>
  604——▶ <dc:date>2005</dc:date>
  605——▶ <dc:description></dc:description>
  606——▶ <dc:creator><Agent><dc:title>joynce</dc:title></Agent></dc:creator>
  607——▶ <dc:rights><Agent><dc:title>joynce</dc:title></Agent></dc:rights>
  608——▶ <dc:type rdf:resource="http://purl.org/dc/dcmitype/StillImage" />
  609——▶ <license rdf:resource="http://creativecommons.org/licenses/by-nc/2.0/" />
      </Work>
610——▶ <License rdf:about="http://creativecommons.org/licenses/by-nc/2.0/">
  611——▶ <permits rdf:resource="http://web.resource.org/cc/Reproduction" />
  612——▶ <permits rdf:resource="http://web.resource.org/cc/Distribution" />
  613——▶ <requires rdf:resource="http://web.resource.org/cc/Notice" />
  614——▶ <requires rdf:resource="http://web.resource.org/cc/Attribution" />
  615——▶ <prohibits rdf:resource="http://web.resource.org/cc/CommercialUse" />
  616——▶ <permits rdf:resource="http://web.resource.org/cc/DerivativeWorks" />
      </License>
```

```
601
                                                                       618                        617
<div id="photo_notes" class="photo_notes"><div id="notes_text_div"></div>
</div><div id="comm_div"></div><div id="rotate_div"></div><div id="shadow_div"></div><div
id="photoImgDiv2886497" style="width:502px" class="photoImgDiv"><img src="http://static.flickr.com/
3/2886497_5636173027.jpg?v=0" alt="" width="500" height="375" onload="show_notes_initially()"></div>
<script type="text/javascript">_decorate(_ge('photo_notes'), _ge('photoImgDiv2886497'), 2886497, 'http://
static.flickr.com/3/2886497_5636173027_t.jpg', '1.5');</script>
<form id="fave_form" method="post" style="visibility:hidden;"><input type="hidden" name="magic_cookie"
value="0" /><input type="hidden" name="faveadd" value="0"><input type="hidden" name="faveremove"
value="0"></form><form id="blog_form" method="post" style="visibility:hidden;" action="/blog.gne"><input
type="hidden" name="magic_cookie" value="0" /><input type="hidden" name="photo" value="2886497"><input
```

Figure 6

USER INTERFACE FOR MEDIA ITEM PORTION SEARCH TOOL

CROSS-REFERENCE TO RELATED APPLICATION

This application claims the benefit of and is a continuation-in-part of U.S. application Ser. No. 11/247,015 filed Oct. 10, 2005, entitled A DATA CONTAINER AND SET OF METADATA FOR ASSOCIATION WITH A MEDIA ITEM AND COMPOSITE MEDIA ITEMS, which is hereby incorporated herein by reference; and this application claims the benefit of and is a continuation-in-part of U.S. application Ser. No. 11/247,562, filed Oct. 10, 2005, entitled A SET OF METADATA FOR ASSOCIATION WITH A COMPOSITE MEDIA ITEM AND TOOL FOR CREATING SUCH SET OF METADATA, which is also hereby incorporated herein by reference.

FIELD OF THE INVENTION

The present disclosure relates generally to a user interface for accessing and utilizing a media item portion database. In one aspect, media item portion entries of the database are used for remixing and creating new composite media items.

BACKGROUND OF THE INVENTION

The practice of mixing and remixing media is no longer restricted to media professionals. Emerging technology of remixing digital media enables end-users to combine media elements new media products. New digital media data models, such as the MPEG-21 standard or enhanced ID3 tags, enable the binding of detailed descriptions or metadata about an item of digital media. Such data models can make it possible to determine what portions of a media item and its metadata are contained in a given media item. Currently, such metadata is typically entered manually in ad hoc formats into whatever tags are available, such as, for example, ID3 tags in MP3 files.

Further, current sources of remixable media item portions are unorganized, disparate, and unreliable. Furthermore, the media item portions are typically uploaded manually. Thus, there lacks a database of media item portion entries intended for locating media item portions and use in producing new composite remix media items.

SUMMARY OF THE INVENTION

The present disclosure addresses this deficiency in the current art. The present disclosure relates generally to a user interface for accessing and utilizing a database of media item portion entries. In one aspect, media item portion entries of the database are used for remixing and creating new composite media items.

In one embodiment, the present disclosure generally relates to a user interface comprising a search entry area for populating with a parameter associated with a desired media item portion, the desired media item portion being associated with a media item portion entry accessed from a searchable media item portion database comprising metadata stored in accordance with a data container format; a user input element for initiating a search of the media item portion database in accordance with the parameter; a first area for displaying a result of the search, the result comprising metadata associated with the desired media item portion, the displayed metadata being displayed in a manner so as to translate some portion of the metadata in the data container format into user perceptible form; and a second area for displaying filter parameters by which the metadata may be filtered to affect which metadata is displayed.

In one embodiment, the search entry area comprises a text entry box. In a further embodiment, the search entry area comprises a drop-down menu from which parameters may be selected.

In one embodiment, the populated parameter comprises, but is not limited to, any of the following media item portion information such as a title associated with the media item portion, a format type associated with the media item portion, the identity of a creator of the media item portion, the identity of an owner of the media item portion, a genre associated with the media item portion, and/or commerce enabling information associated with the media item portion.

In one embodiment, the user input element comprises a button.

In one embodiment, the displayed metadata is displayed in the first area in a columnar format. In one embodiment, the displayed metadata comprises, but is not limited to, any of the following media item portion metadata such as a title associated with the media item portion, a format type associated with the media item portion, a size associated with the media item portion, the identity of a creator of the media item portion, the identity of an owner of the media item portion, a set of usage rights associated with the media item portion such as a commercial designation indicating that the media item portion may be used for commercial purposes or a non-commercial designation indicating that the media item portion can only be used for non-commercial purposes. Further, the displayed metadata may comprise metadata identifying a licensing term associated with a media item portion such as a price per copy of the media item portion, a genre associated with the media item portion and/or commerce enabling information.

In one embodiment, the filter parameters are displayed as a categorical menu. In one embodiment, the filter parameters may comprise any of the following, but not limited to, an audio file filter, a video file filter, an image file filter, a text file filter, a filter associated with displaying in the first area only locally stored media item portions, and/or a filter associated with displaying in the first area only media item portions accessible from the database.

In one embodiment, the user interface further comprises a third area comprising a first interactable indicia representing a media item portion addition action for signaling a program to add the media item portion to a user's local media item portion library.

In one embodiment, the user interface further comprises a third area comprising a first interactable indicia representing a media item portion bookmarking action, for signaling a program to create a reference associated with the media item portion on a user's local browser.

In one embodiment, the user interface further comprises a third area for displaying a graphical representation of a media item portion entry upon highlighting (highlighting may be accomplished by a single click of a mouse) a result from the first area.

In one embodiment, wherein upon selecting (selecting may be accomplished by a double click of a mouse, so as to cause activation) the result from the first area causes the display of a fourth area displaying commerce enabling information with the media item portion. In a further embodiment, the fourth area comprises a subarea containing a portion of the commerce enabling information. In yet a further embodiment, the fourth area comprises a plurality of subareas each displaying a portion of the commerce enabling information.

In one embodiment, the commerce enabling information comprises any of the following, but is not limited to, an attribution of a publisher, a price per copy of the media item portion, an identity of a rights holder, a set of licensing term, a copyright message, a digital rights message, a pointer to a copyright message, a pointer to licensing information.

In one embodiment, upon selecting the result from the first area, sad first area displays a graphical representation of the media item portion. In a further embodiment, the first area further displays textual information associated with the media item portion.

BRIEF DESCRIPTION OF THE DRAWINGS

The following drawing figures, which form a part of this application, are illustrative of embodiments of the present invention and are not meant to limit the scope of the invention in any manner, which scope shall be based on the claims appended hereto.

FIG. 6 illustrates exemplary source code according to an embodiment of the present disclosure;

DETAILED DESCRIPTION OF EMBODIMENTS

Figure 1:
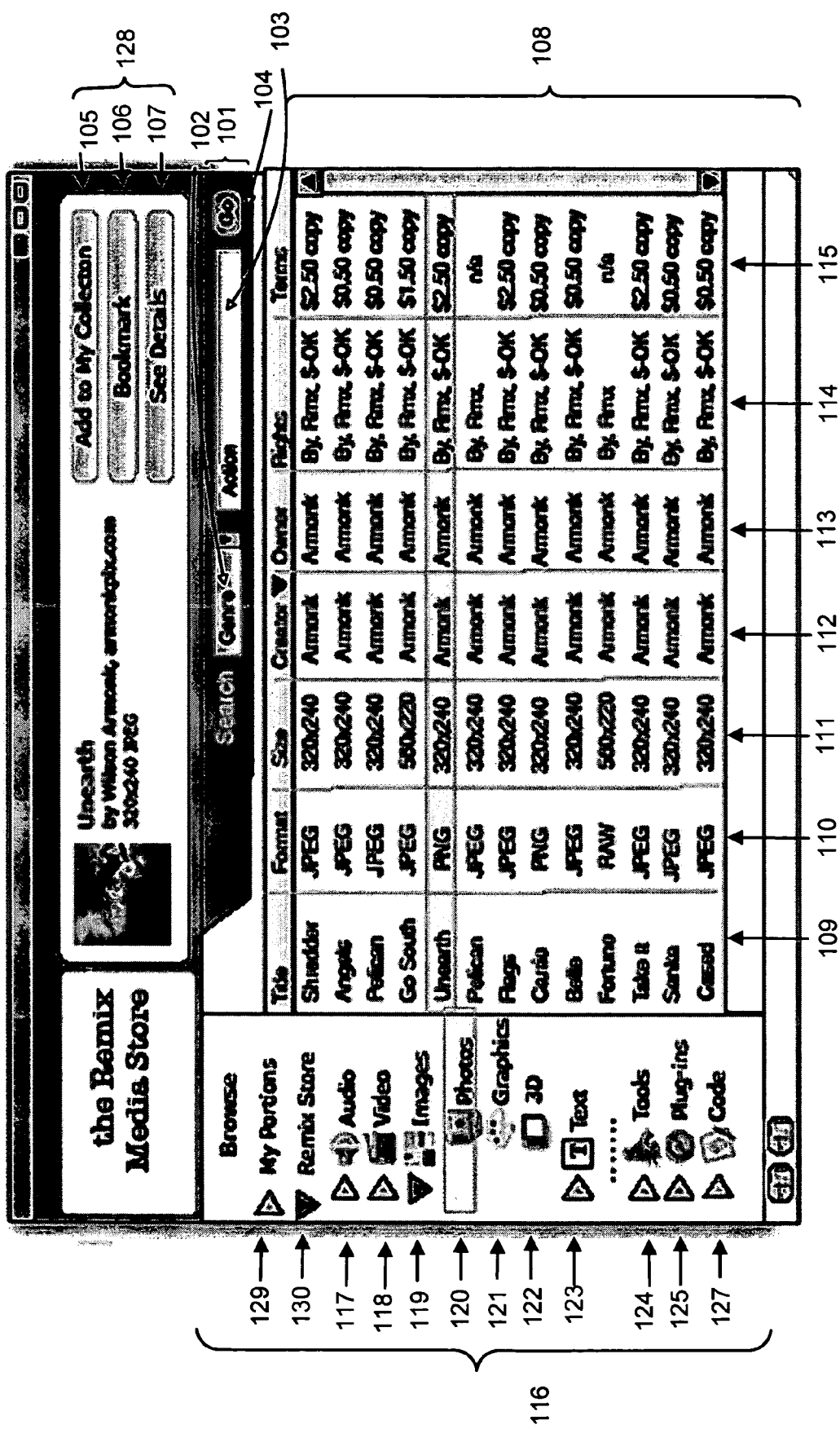
FIG. 1 is an exemplary user interface according to an embodiment of the present disclosure.

In one embodiment, the present disclosure relates generally to a method for creating a database of media item portion entries. In another embodiment, the present disclosure relates to a user interface for a media item portion database. In another embodiment, the present disclosure generally relates to a method for searching for media item portions. In another embodiment, the present disclosure relates to a user interface for searching for media item portion entries and associated information from such a database. In one embodiment, such associated information comprises commerce enabling information useful in the composite media item marketplace. It is noted that the term commerce as used herein is intended to encompass many types of transfers of items between one person or entity to another. Further, the term commerce is not limited to requiring monetary transfer or transfer of value to accompany such commerce transaction.

It is also noted that the term "remix store" as used herein in one embodiment can be used interchangeably with the term "database" or any other type of media item portion, metadata and relevant information storage. It is further noted that the term database as used herein can mean any collection of entries which may be accessible and/or searchable. In one aspect, a database comprises an organized body of information. In one aspect, a database comprises a systematically arranged collection of computer data, structured so that it can be retrieved or manipulated. Further, the database may be a single database or a distributed database located anywhere such as the internet, a network, on a local area network, wireless area network, on a computing device, or any type of suitable infrastructure.

Certain embodiments of the present disclosure will now be discussed with reference to the aforementioned figures wherein like reference numerals refer to like components. The figures are intended as exemplary embodiments and are not intended to be limiting.

In one embodiment, the present disclosure relates generally to a database of media item portion entries. In one general embodiment, each entry is associated with a media item portion, relevant metadata, other associated information which may or may not be derived from the metadata associated with the media item portion and combinations thereof.

In some embodiments, the media item portion may be any type of identifiable portion or component of media item. As used herein, the terms "content", "media", or "media items" are used broadly to encompass any type or category of experienceable, retrievable, filed and/or stored media, either singly or collectively, and individual items of media or content are generally referred to as entries, songs, tracks, items or files, however, the use of any one term is not to be considered limiting as the concepts features and functions described herein are generally intended to apply to any storable and/or retrievable item that may be experienced by a user, whether audibly, visually or otherwise, in any manner now known or to become known. Further, the term media comprises all types of media such as audio and video, text, photos, or other forms. Thus, a media item portion may comprise an a capella track, a backing track, a sample or loop of a media item recording, the beat of a media item, the chords of a media item, a graphical still image, a portion of a video file or other type of dynamic image, the equalizer presets, a band or orchestra accompaniment, the instrumentals, a conductor or performer refinement, or part of a set, or any other identifiable portion of a media item.

Figure 7:
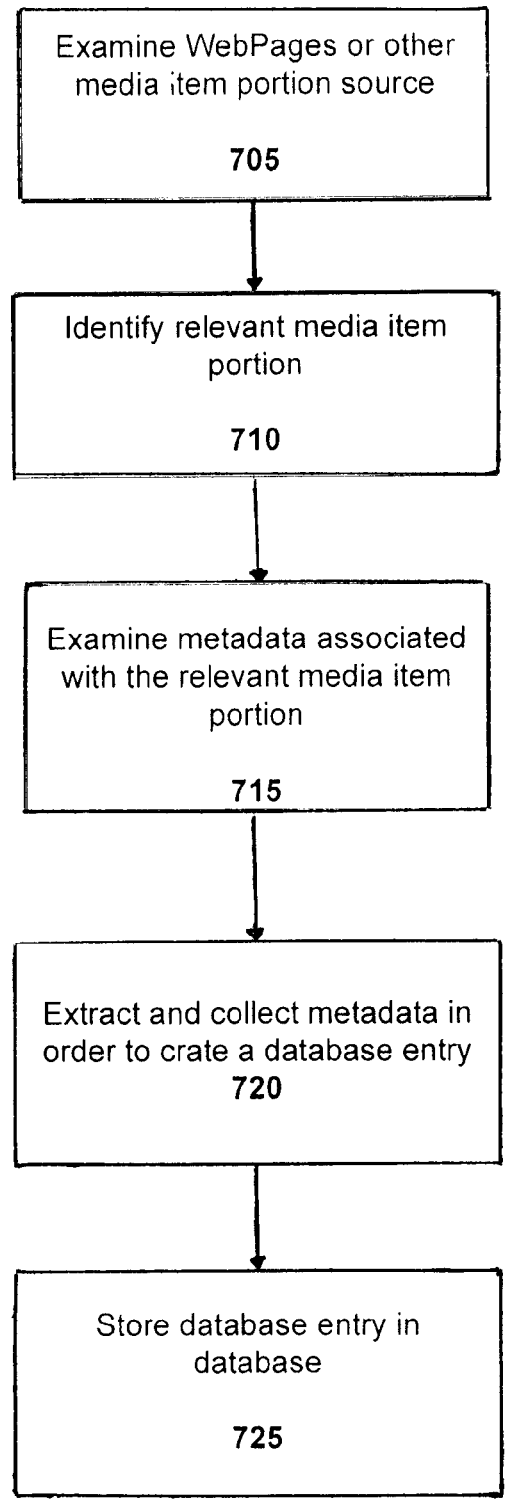
FIG. 7 is an exemplary flowchart illustrating an embodiment of the present disclosure.

One exemplary embodiment of creating and storing a media item portion database entry is depicted in FIG. 7. As depicted in FIG. 7, in general, a database entry is created by examining 705 web pages or other media item portion sources, identifying 710 relevant media item portions, examining 715 relevant metadata associated with the media item portion, and extracting and collecting relevant metadata for creating 720 the database entry based in part on the relevant metadata. Then, in a further embodiment, the database entry is stored 725 into a database.

It should be noted that the process as depicted in FIG. 7 is not limited to simply accessing webpages. It is further contemplated that RSS media feeds, a media RSS feed, a network-accessible database, a user's local media item portion storage, or other sources of media item portions and associated information wherever located may be accessed in order to perform the process as depicted in FIG. 7.

Figure 5:
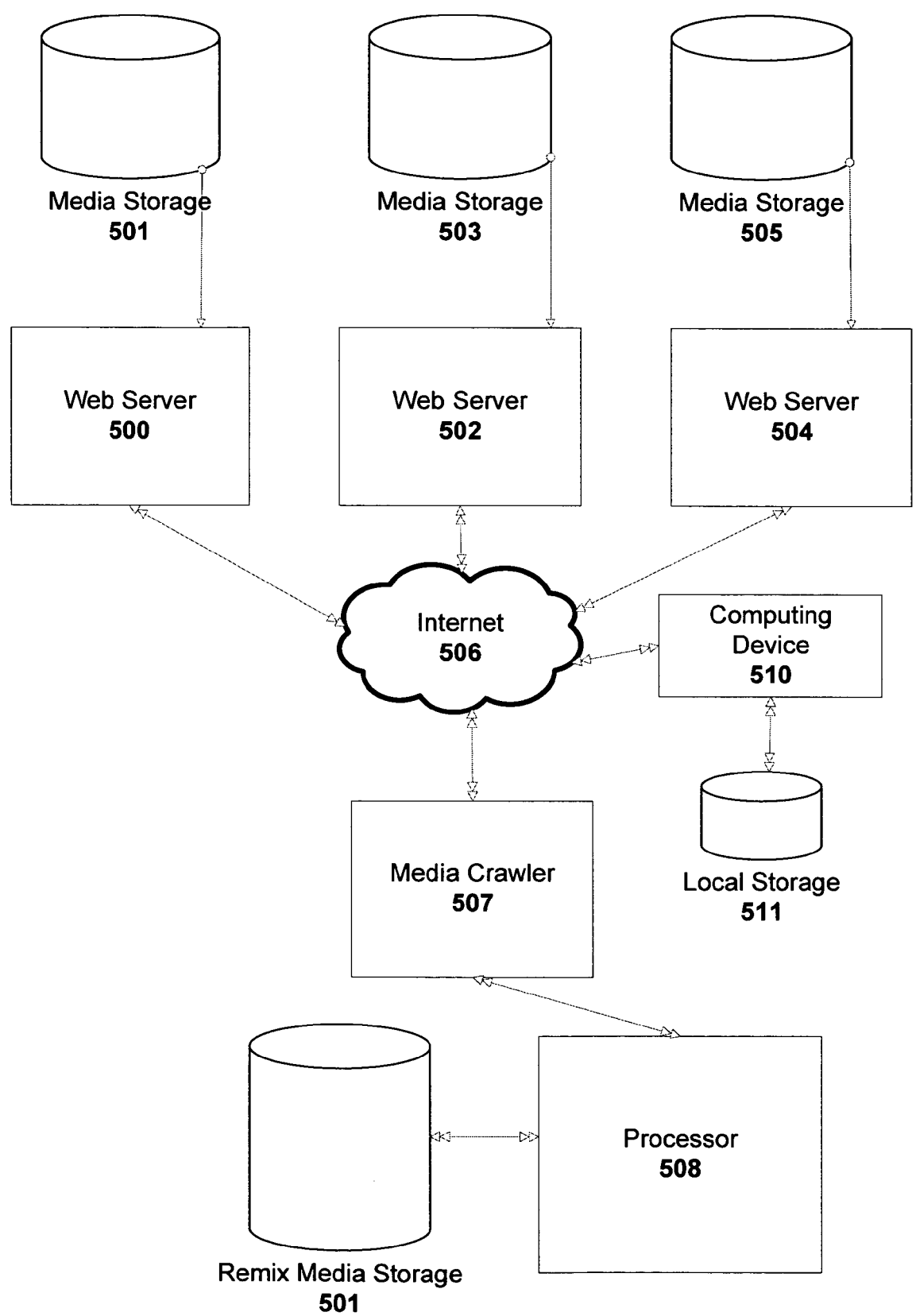
FIG. 5 is an exemplary system configuration according to an embodiment of the present disclosure.

In one embodiment, whether media item portions are considered relevant, whether metadata is considered relevant, whether the metadata should be included in a database entry and whether there is enough metadata information in a database entry to create a composite media item is preferably governed by predetermined application requirements. In one embodiment, the processor 508 as depicted in FIG. 5, is capable of applying these predetermined requirements to determine whether a media item portion is considered relevant, whether metadata is considered relevant, whether the metadata should be included in a database entry and whether there is enough metadata information in a database entry to create a composite media item.

In one embodiment, a predetermined requirement may be based on conditional logic. In another embodiment, a predetermined requirement may be based on whether a specific amount and a specific type of metadata or information associated with the media item (as described herein) is present.

For example, a media item portion may not be considered relevant during the step 710 of identifying a relevant media item portion as depicted in FIG. 7 if the media item portion does not have at least one type of commerce enabling information such as the identity of the creator. Thus, in this example, media item portions that do not have metadata that identifies the creator will not be considered relevant during step 710 as depicted in FIG. 7.

In another example of applying predetermined requirements, metadata associated with a media item portion may not be considered relevant during step 715 as depicted in FIG. 7 if the metadata associated with the media item portion has already been found and included in the database entry. Thus, in this example, repetitive metadata will not be considered relevant.

Figure 8:
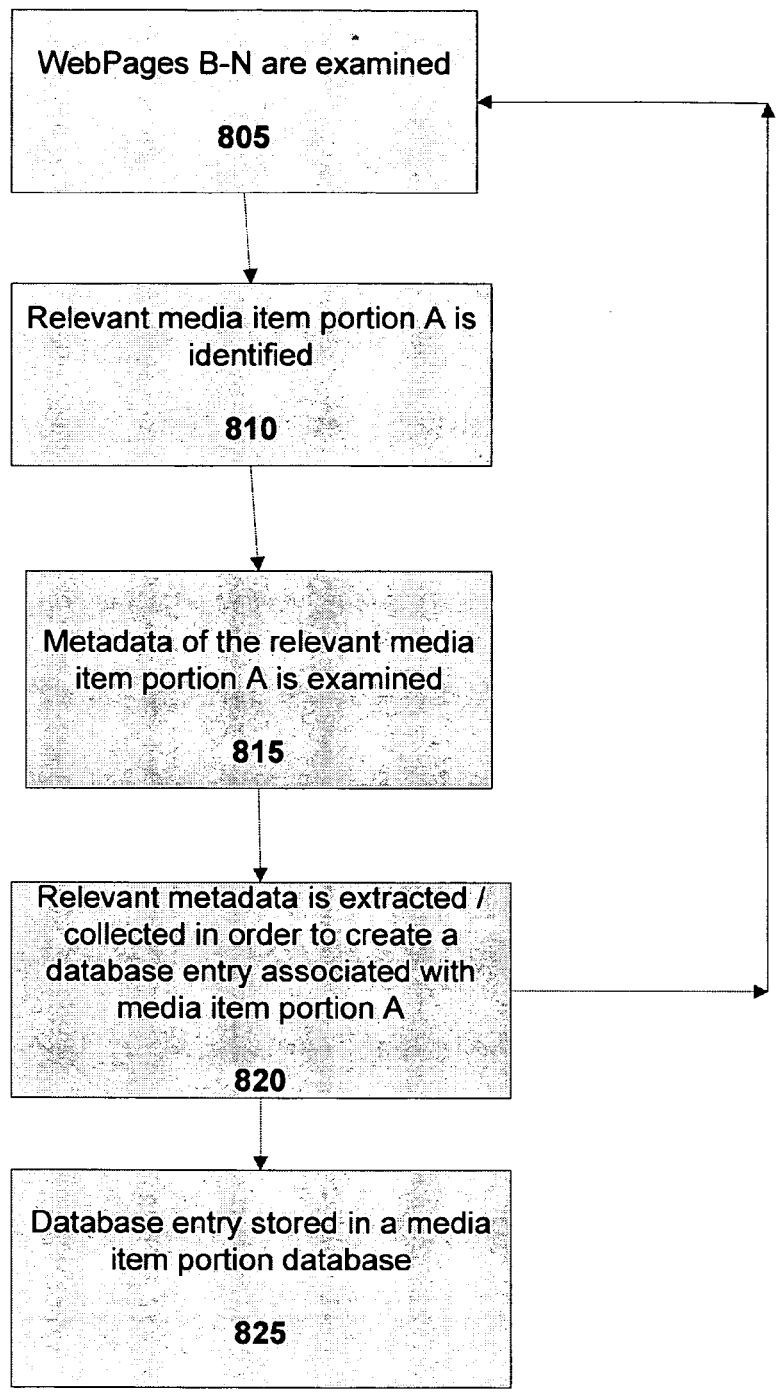
FIG. 8 is an exemplary flowchart illustrating an embodiment of the present disclosure.

In another example of applying predetermined requirements, metadata should not be extracted and collected to create a database entry during step 720 as depicted in FIG. 7 if is either repetitive or does not have at least one type of information such as licensing terms. In a further embodiment, a database entry will not be considered complete or finished until a predetermined amount and type of information is included in the database entry. Accordingly, until the appropriate information is identified, collected and extracted, the database entry will be "put on hold" until finished. Thus, through repeating the process as depicted in FIG. 8 by scanning numerous WebPages, RSS media feeds, a media RSS feed, a network-accessible database, a user's local media item portion storage, or other sources of media item portion information, a database entry can be created from multiple iterations and different sources.

Referring back to FIG. 7, it is contemplated that the steps of examining 705 web pages and identifying 710 relevant media item portions are facilitated in several different ways as further depicted in FIG. 5. Turning now to FIG. 5, an exemplary embodiment of system configuration comprises several media stores or databases (501, 503, and 505), several web servers (500, 502, and 504), the Internet and 506, a media crawler 507, a computing device 510 with local storage 511, a remix media store or database 509, and a processor 508. In one embodiment, the media stores or databases (501, 503, and 505) comprise any type of hard drive or other form capable of storing media.

As depicted in FIG. 5, media stores or databases (501, 503, 505) are accessible to web servers (500, 502, 504), whether directly or indirectly connected. In one embodiment, the web servers make web pages available that contain relevant media item portions and their associated metadata. Thus, in one embodiment, an end-user, through the internet 506 and a local computing device 510, can examine WebPages in order to identify relevant media item portions.

In another embodiment, web pages may be examined and media item portions identified automatically by a program that "crawls" or "spiders" the WebPages. Typically, these spiders or crawlers collect information from various WebPages. Exemplary methods for crawling information on a network or internet is described in commonly owned U.S. Pat. No. 6,021,409, entitled "METHOD FOR PARSING, INDEXING AND SEARCHING WORLD-WIDE WEB PAGES," the disclosure of which is hereby incorporated by reference in its entirety. In one embodiment, the crawling program 507 crawls through media content located on a network such as the Internet 506, collecting and examining WebPages for relevant media item portions. In a further embodiment, an index component (not depicted) which may or may not be a part of the media crawling program 507 parses and indexes media item portions and associated information collecting or examined by the web crawling process. In one embodiment, the index component generates an index that defines a structure for the media item portions and related information that allows for location and retrieval of the media item portions and related information. According to one embodiment, the index component creates an index of word-location pairs that allows a search engine to determine specific media item portions and information regarding the same in response to a query, which may be from a user, software component, automated process, etc. Exemplary methods for indexing information is described in commonly owned U.S. Pat. No. 5,745,889, entitled "METHOD FOR PARSING INFORMATION OF DATABASE RECORDS USING WORD-LOCATION PAIRS AND METAWORD-LOCATION PAIRS," the disclosure of which is hereby incorporated by reference in its entirety. In one embodiment, index information that the index component generates is written to an index data store or database for storage.

In other embodiments, the processor as depicted in FIG. 5 is capable of determining or identifying and/or indexing relevant media items among disparate format types, structures, and/or sources. For example, in one embodiment, the processor is capable of interpreting, translating, or otherwise effectively identifying and indexing media items from a RSS feeds, media items written in MPEG-21 standards, written as an ID3tag, and any other standards or programs associated with media items.

Turning back to FIG. 7, after a relevant media item portion is identified 710, metadata associated with the relevant media item portion is then examined 715. In one embodiment, as depicted in FIG. 5, a processor 508 is able to examine and identify relevant metadata associated with the media item portion. The processor may or may not be located as a part of a user's computing device 510. In one embodiment, the processor 508 examines the web page by duplicating or caching them into accessible computer memory. Then, the processor 508 can search for patterns or keywords corresponding to the relevant metadata. For example, the processor 508 may search for keywords such as "author" or "creator" to obtain the corresponding string of characters that indicates authorship.

In another embodiment, as depicted in FIG. 6, relevant metadata associated with the media item portion may be examined by examining the web page source code. As can be seen, FIG. 6 depicts two portions 600, 601 of web page source code containing metadata available for examination. For example, referring to webpage source code 600, rights information is encoded that corresponds to the rights information visible to users through a user interface as described in further detail herein. In one embodiment, rights information is organized using a formal description standard (Resource Description Framework, for example). FIG. 6 depicts an example of resource description framework (RDF) standard code 617. In one embodiment, using a formal description standard such as RDF provides a structured way to organized descriptive information so that it can be parsed and processed by either users and/or computer programs. For example, in FIG. 6, the RDF standard comprises an "about" clause 602 which functions to highlight specific metadata. In one embodiment, the "about" clause 602 and similar markers function to highlight the relevant metadata associated with a media item portion. As seen in FIG. 6, following the "about" clause 602 is metadata comprising the title 603 of the media item portion, the date 604 the media item portion is created, a placeholder 605 for a textual description, the identity 606 of the creator of the media item portion, the rights holder 607 associated with the media item portion (may or may not be the same as the creator), and the type 608 of media item portion. In another embodiment, the relevant metadata comprises a set of rights 610 associated with the media item portion. It is noted that the set of rights may comprise any type of commerce enabling information. In one embodiment, commerce enabling information governs the use of a media item portion. Commerce enabling information refers, by way of non-limiting example, to information, data, or pointers thereto, that can be utilized to facilitate electronic commerce involving a media item. For example, such commerce enabling information can comprise the identity of attribution, the identity of a rights holder, a link or address of a website, a copyright message or a pointer thereto, licensing information or pointer thereto, or a digital rights management (DRM) related license or authorization or pointer thereto. The commerce enabling information may also comprise the authorship of the media item portion, the royalty amount of each media item portion, the price per copy of the media item, whether the media item portion is available for combining, the business terms, rules, and rights governing the use of a media portion could include designations derived from the metadata subsets such as whether a media item portion is designated non-commercial or commercial-only, or is designated as unavailable for inclusion in any derivative works or conversely is designated as available for inclusion in any derivative works, and designated as share-alike, meaning that a new derivative work containing the media portion can only be made available with identical licensing terms.

For example, in FIG. 6, the set of rights 610 associated with the media item portion is from a creative commons license and comprises rights-related information concerning reproduction 611, distribution 612, notice 613, attribution 614, commercial use 615, and derivative works 616. In further embodiments, other metadata information such as the URL 617 associated with the media item portion may be located in the webpage source code and dimension information 618 (if applicable) of the image. It should be noted that many ways of examining metadata is contemplated is not limited to examining webpage source code.

In further embodiments, the metadata considered relevant may comprise information or data about a media item portion such as the name of the artist or performer, the album name, the identity of a composer, the identity of lyricist, the identity of a lead performer or soloist, the genre, the tempo, the rhythm pattern, the date or time of recording of the media item, identity of the language associated with the media item, the original filename of the media item, the original release year of the media item, the format type of the media item, a URL or link to the official webpage of an on-demand music service or internet radio station, or the a URL or link to the official webpage of the artist, album, rights holder, or producer associated with the media item, or the size of each media item portion, or the price of per copy of each media item portion.

In one embodiment, if it is determined (by the processor 508, for example) that a webpage indicates metadata for relevant media may be present, but does not find corresponding data as expected, then according to the policies of the entity operating the processor 508, the processor 508 will either ignore the site, make a "best guess" and possibly mark this library entry as "unreliable"; and/or provide a notification to the operators that a potentially relevant site has been identified, along with a report indicating where the information found on the site did not conform with expectations, such that the site operators could subject the site information to further analysis and potential updating of the processor's 508 keywords, patterns, and comparison operators to correctly ingest the relevant metadata, and thereby grow the database. In a further embodiment, the operators of the processor and the resulting database may publish the keywords and patterns it is capable of interpreting at any given time, to enable media providers to proactively prepare their media for discovery by the processor, so that it may beneficially be included in the media item portion database.

Turning back to FIG. 7, once all the metadata is examined and the relevant metadata is identified, step 715, the relevant metadata is extracted or otherwise collected in order to create 720 a database entry. In one embodiment, the database entry comprises some or all of the relevant metadata examined in step 715.

In another embodiment, the database entry comprises the media item portion itself and relevant metadata. In a further embodiment, the database entry comprises a pointer or reference to the media item portion and relevant metadata that identifies where the actual media item portion may be located or accessed from.

In another embodiment, the database entry comprises multiple metadata portions each associated with the same media item, however derived from multiple and/or different WebPages. For example, as depicted in FIG. 8, the process (805-825) for creating a media item portion database entry may be repeated for as many multiple WebPages (denoted by A-N) wherein each Webpage A-N contains relevant metadata associated with a particular media item portion. For example, if a media item portion database entry is associated with a particular media item portion, a backing track of a media file, the database entry may comprise metadata derived from multiple WebPages each comprising relevant metadata associated with the particular backing track. For example, one webpage may have relevant metadata associated with the backing track such as the author of the backing track. Another webpage may have relevant metadata such as the price per copy of the backing track. Thus, in one embodiment, the database entry will comprise metadata from both sources, meaning both the author and price per copy. Of course, this process may be repeated as many times as necessary to create a full and robust database entry. In further embodiments, this process may occur upon a routine update, upon a user request, or whenever the processor 508 (as described herein) notes that there is new information or metadata associated with a media item portion associated with a database entry. Thus, the relevant metadata associated with the same media item may come from different locations and/or different WebPages or different media item portion sources.

In one embodiment, the relevant metadata is extracted/collected by a processor (in one embodiment, depicted as item 508 in FIG. 5) that copies the relevant metadata information into a new data structure. In one embodiment, the information may be copied into a data structure comprising a series of fields in a relational database record. In another embodiment, the information may be copied into a data structure comprising a predetermined data container format which may or may not be stored in an object database. Thus, in one embodiment, the database entry comprises a predetermined data container format. Typically, a data container is a data structure that allows items and or other containers to be grouped. In one embodiment, a data container can also comprise sets of metadata which may or may not be physically located in the container. In one embodiment, the data container may comprise any combination of the following: a media item portion, a pointer or reference to a media item portion, container related information or pointer or reference thereto, and/or relevant media item metadata. Thus in one embodiment, the data container comprises any number and type of set(s) of metadata associated with a media item portion or pointer thereto, any number and type of set(s) of metadata associated with the container itself or pointer thereto and any number and type of media item identifier(s) or pointer thereto.

In one embodiment, the data container comprises a media item portion identifier. In one exemplary embodiment, the media item portion identifier comprises information identifying the media item portion, contents of the media item portion itself, and information associated with the media item portion. In one embodiment, a media item portion identifier comprises a pointer, reference, uniform resource location, and/or universal resource identifier. In one embodiment, the media item portion identifier references the location of the media item portion itself and/or relevant metadata. In other embodiments, the media item portion may be located, identified, and/or acquired from several sources and through different ways. In another embodiment, the media item portion identifier may be a pointer, a uniform resource locator, or an id unique to an online music service or an online community. For example, the media item portion may be acquired from a server, from a user's local media library, from an on-demand streaming music service, and/or from the internet. In one embodiment, the data container comprises commerce enabling information (as described herein) associated with a media item portion.

Furthermore, in one embodiment, the data container comprises metadata related to the container itself, ie. container related data. In another embodiment, the container related metadata can include any type, combination, or number of information or data associated with the attributes of a media item source (if any), media item portion, or media item. In one exemplary embodiment, the container related metadata comprises a string of text representing the name of the container, a string of text representing the media item portion title, the date the container is created and/or last modified, the genre associated with the overall items within the container, the size of the container, the length of the container, the content type of the container, the file type, the international standard recording code associated with the container, the software and/or hardware necessary for encoding and decoding the container and its items, and/or any user-defined text information. Further, any and all methods and programs for creating such a data container known by one skilled in the art presently or the equivalents thereof in the future are also contemplated.

Figure 9:
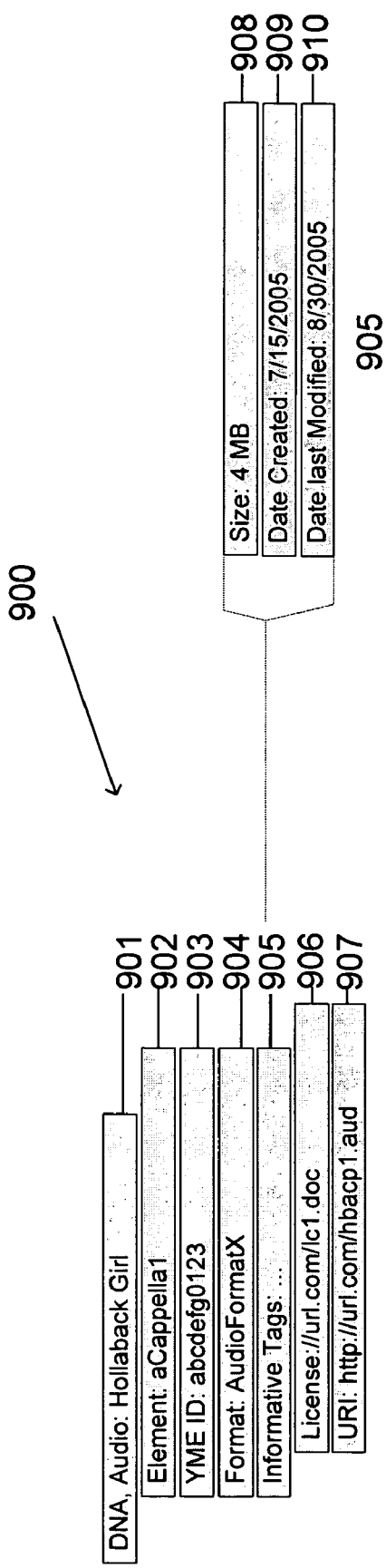
FIG. 9 illustrates an exemplary data container of an embodiment of the present disclosure.

For example, FIG. 9 illustrates one exemplary embodiment of a data container 900 associated with a media item portion. As can be seen in the embodiment depicted in FIG. 9, the data container 900 comprises metadata information in associated with a media item portion. In the embodiment as depicted in FIG. 9, the data container is associated with a media item portion that is the a capella track portion of a song. As can be seen in FIG. 9, the data container 900 comprises metadata or information associated with the media item portion such as a name or descriptive term associated with the media item portion 902, an ID unique to a community or online music service 903, a format type of the container 904, a set of informative tags 905, a pointer to a set of rights 906, and a pointer 907 to a physical file location of the associated media item portion. Further, as depicted in FIG. 9, the informative tags 905 may comprise information such as the size 908 of the media item portion, the date 909 the media item portion was created, and/or the date 910 the media item portion was last modified. Of course any type of metadata or information or commerce enabling information associated with the media item portion as described herein may be included in the container. In a further embodiment, if the media item portion is derived from a media item, the identity of the media item 901 may be included.

Regardless of what form the database entry takes, referring back to FIG. 7, after the entry is created, step 720, it is stored 725 into a database. In one embodiment, the resulting database entry is stored in a central location. For example, referring to FIG. 5, the database entry may be stored in a location such as the remix media store or database 509, a physical volume or volumes containing structured data. In another embodiment, the database may be stored 511 on a user's local computing device, or may exist as a distributed database at multiple locations.

In one embodiment, the method depicted in FIG. 7 may be repeated for as many different media item portions from as many different sources to create many different database entries. For example, referring to FIG. 5, to further populate the database, the processor 508 can examine other websites containing potentially relevant media, as identified by the Media Crawler 507. When such sites are located, the processor 508 will as before, search for appropriate strings of information that indicated relevant metadata is present. Where interpretable patterns and keywords are present, the processor 508 locates relevant metadata that corresponds to the kinds of data associated with the keywords and patterns, the media item portions associated metadata is extracted/collected, formulated into an database entry comprising a structured format and then written into a volume associated with remix media store or database 509. Thus, a database containing many different media item portion entries associated with various types of media item portions is created. In one embodiment, each database entry corresponds to a media item portion available for remixing and combining with other media item portion(s) to create a new composite media item. Therefore, in one embodiment, a database of remixable media item portions may be made available to those seeking media to remix media item portions into new composite media items.

By creating a database of media item portion entries as described herein, remix or composite media item creators would then have a definitive source of relevant remixable media, with well-structured metadata at their disposal, thereby enabling both the quantity and quality of the media products produced, but also supporting a rich marketplace remixable media suppliers, remixers, and end-user remix media consumers, including the revenue generated in such a marketplace.

In a further embodiment, a remix media database browser enables a user to preview media item portions, the full media item, examine rights for suitability to the intended use, get appropriate descriptive and authorship information, and find and obtain the media item portion itself for remix media operations.

In another embodiment, the present disclosure relates to a user interface for searching for media item portion entries and associated information from a database. In one embodiment, the user interface allows a user to search and/or browse for media item portions from the database 501/511 (wherever located) as descried herein. An exemplary user interface is depicted in FIG. 1.

As can be seen in FIG. 1, in one embodiment, the user interface comprises several areas or regions 128, 101, 108, and 116. In one embodiment, the user interface comprises an area 128 for viewing a thumbnail image or other graphical representation and/or summary information identifying a media item portion and certain controls for manipulating or obtaining further information about the media item portion. As depicted in FIG. 1, area 128 comprises several user input indicia, buttons, 105, 106, and 107. In one embodiment, button 105 adds the media item portion to a user's collection of remixable media or media item portion. In one embodiment, adding a media item portion to a user's collection allows the media item portion to become available for further manipulation or editing as the user creates a new composite media item. In one embodiment, it is possible that the media item portion may be added to the collection without any charge, or that the media item portion carries a fee simply for acquiring it form possible future use, or there may be other commercial terms involved of different natures. In any event, selecting button 105 adds the media item portion to the user's collection of remixable media or media item portions. In one embodiment, button 106 adds a reference to the user's browser or to the user interface to a particular media item portion, such that the media item portion can be found and reviewed again at the user's convenience. In one embodiment, button 107 enables the user to view and/or access further detail about a particular media item portion in an expanded view within the interface.

In one embodiment, the user interface further comprises an area 101 for entering text representing a search or browse input criteria indicating a desired media item portion and a button 104 for triggering the search. In one embodiment, the area 101 may comprise a text box 103 and/or a drop down menu 102. In one embodiment, the user may search for media item portions by jointly using the text field box 103 and the drop down menu 102. For example, the drop down menu 102 may comprise selections such as genre, artist, rights availability, format, or any other attribute associated with a media item portion. Then, the user can enter text into the text field box 103 which corresponds to the drop down menu choice selected. For example, as depicted in FIG. 1, the drop down menu 102 choice is "genre" and the "action" genre has been entered into the text field box 103. Thus, in one embodiment, selecting the user input indicia, or button 104, will signal the program to search the database 501/511 (as described herein) containing media item portion entries for all media item portions that match the search criteria. In particular, as depicted in FIG. 1, the media item portions associated with an action genre will be searched.

In a further embodiment, the user interface further comprises an area 108 for displaying the results of a media item portion search. In one embodiment, as depicted in FIG. 1, the area 108 lists each media item portion entry and/or metadata by columns associated with the media item portion. As seen in FIG. 1, each media item portion entry has an associated title column 109 that lists the title of the media item portion, a format column 110 for listing the type or format of the media item portion, a size column 111 that lists the size of the media item portion, a creator column 112 that identifies the creator of the media item portion, an owner column 113 that identifies the owner of the media item, a rights column 114 that identifies the rights associated with the media item portion, and a terms column 115 that specifies terms, such as price, associated with the media item portion. Thus, the user is able to view information associated with each media item portion through the user interface. In a further embodiment, the user interface allows a user to sort the entry results listed in the display area 108 by a particular column. For example, in column 112, Creator, there is a triangle in the column head pointing down, indicating that the user is sorting by Creators. Since the triangle is down, it indicates an alphabetically descending order, displaying first the names of creators whose names begin alphabetically nearer the end of the alphabet. Of course it is contemplated that the area 108 for displaying the media item portion results may comprise some, all, none, or any other types of associated column categories, or any metadata associated with the media item portion.

In one embodiment, with further reference to FIG. 1, the user interface further comprises an area 116 for browsing available media item portions. In one embodiment, a user may filter their browsing activity by selecting the kind or type of media the user is interested in. For example, as depicted in FIG. 1, the browsing area comprises categories such as audio 117, video 118, images 119, and text 124. In one embodiment, area 116 allows a user to browse the subject media item portions via a categorical menu (117-123), viewing either all available media item portions in the database aka remix store 130 or only those media item portion entries stored locally by the user 129 or a combination of both. For example, in one embodiment, selecting button 130 allows a user to access and categorically browse the remix store or database entries by categorical menu using area 116. In one embodiment, as depicted in FIG. 5, the database entries are stored in the remix store or database 509. Thus, in one embodiment, the user does not need to enter search criteria or parameters. Instead, the user can identify a media item portion by using the browsing area 116.

In another example, selecting button 129 allows a user to access and categorically browse all the media item portions and database entries the user has stored locally. In one embodiment, as depicted in FIG. 5, the database entries are stored locally 511 at the user's computing device 510. Thus, in one embodiment, the user does not need to scroll or tediously go through each database entry and/or media item portion stored in their local media item portion storage. Instead, the user can identify a locally stored media item portion and/or database entry by browsing through their media item portion entries using the hierarchical browsing area. In another aspect, the user does not require access to a remote database entry storage and can identify media item portions offline.

In another example, referring to FIG. 1 if neither button 129 or 130 is selected, the user can browse all media item portions and/or database entries whether stored locally 511 or available on the remix storage 501 as depicted in FIG. 5. In a further embodiment, a marker or indicator (not depicted) could appear next to each displayed database entry so as to denote the source (whether local (e.g. 511) or from the remix media storage (e.g. 501)) of each database entry. In a further embodiment (not depicted), the browsing area may be used to browse the search results as returned by using the searching area.

Figure 4:
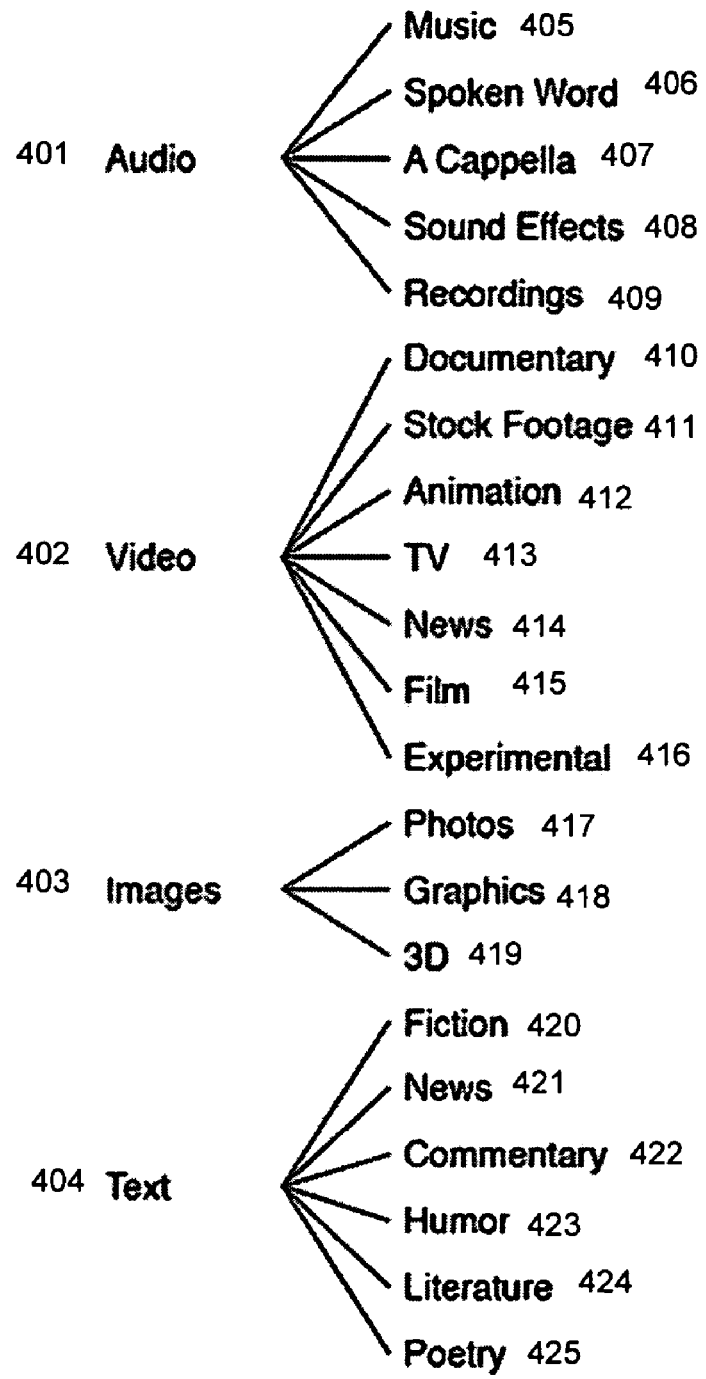
FIG. 4 illustrates exemplary browsing categories according to an embodiment of the present disclosure.

In one exemplary embodiment of browsing via area 116 as depicted in FIG. 1, the user can browse the category "Images" 120 and its subcategories; "Photos" 121, "Graphics" 122, and "3D" 123. One exemplary embodiment of the categories and subcategories available as a user interface categorical menu is depicted in FIG. 4. As can be seen, FIG. 4 lists several categories (401, 402, 403, and 404) and its subcategories (405-425). For example, in FIG. 4, the categories comprise "Audio" 401, "Video" 402, "Images" 403, and "Text" 404. Further, each category comprises subcategories. As seen in FIG. 4, the "Audio" 401 category comprises the subcategories "Music" 405, "Spoken Word" 406, "A Capella" 407, "Sound Effects" 408, and "Recordings" 409. In another example, the "Video" category 401 comprises the subcategories "Documentary" 410, "Stock Footage" 411, "Animation" 412, "TV" 413, "News" 414, and "Film" 415. The "Images" category 403 comprises subcategories "Photos" 417, "Graphics" 418, and "3D" 419. Finally, the "text" category 404 comprises subcategories "Fiction" 420, "News" 421, "Commentary" 422, "Humor" 423, Literature "424", and "Poetry" 425.

Again, in one embodiment, some, all, none, or categories and subcategories similar to those in FIG. 4 may be listed in the user interface area 116 as shown in FIG. 1. For example, referring to FIG. 4 the "Images" category 403 comprises "Photos" 417, "Graphics" 418, and "3D" 419. Similarly, referring to FIG. 1, the "images category" 120 as seen in FIG. 1 comprises of the "Photos" 121, "Graphics" 122, and "3D" 123 subcategories. Thus, through area 116, a user can browse for media item portion entries using a hierarchical menu.

Further, as depicted in FIG. 1, area 116 comprises a browser for non-media items, such as supplementary program, program add-ons, and source code that may be useful to the remix creator. For example, this may comprise offerings such as Tools 124, offering the user a view of programs available to remixers, such as audio or video editors, or programs that support advertising about or commerce in remixable media. In one embodiment, Tools 124 presents any item the service provider wishes to make available to support the end user creation of remixed media or a new composite media item, and such items may have been found through web crawling techniques, or found as a result of their manual entry by personnel of the service provider. Similarly, Plug-ins 125 are useful small programs that may be utilized by remix creators, found and offered as for Tools. Plug-ins are typically program or tool add-ons, such as a visual filter that creates a desired change in or distortion of existing media for esthetic effect. Code 126 are programs in source code format, for utilization by remixers interested in this level of access to tools. An example might be the source code for an audio editing program, enabling the end user to modify the functioning of the editing program in a manner of his or her choosing.

Figure 2:
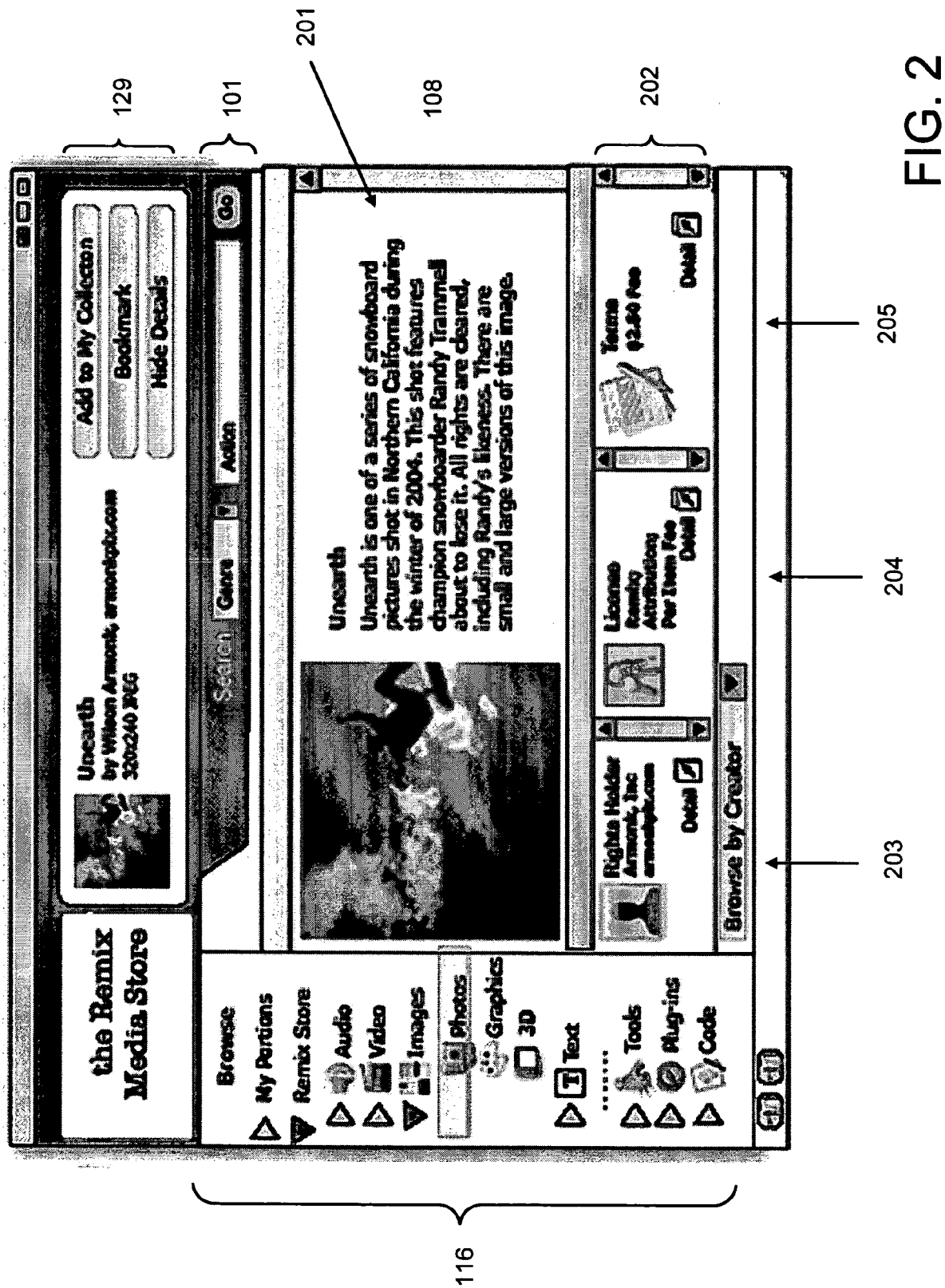
FIG. 2 is an exemplary user interface according to an embodiment of the present disclosure.
Figure 3:
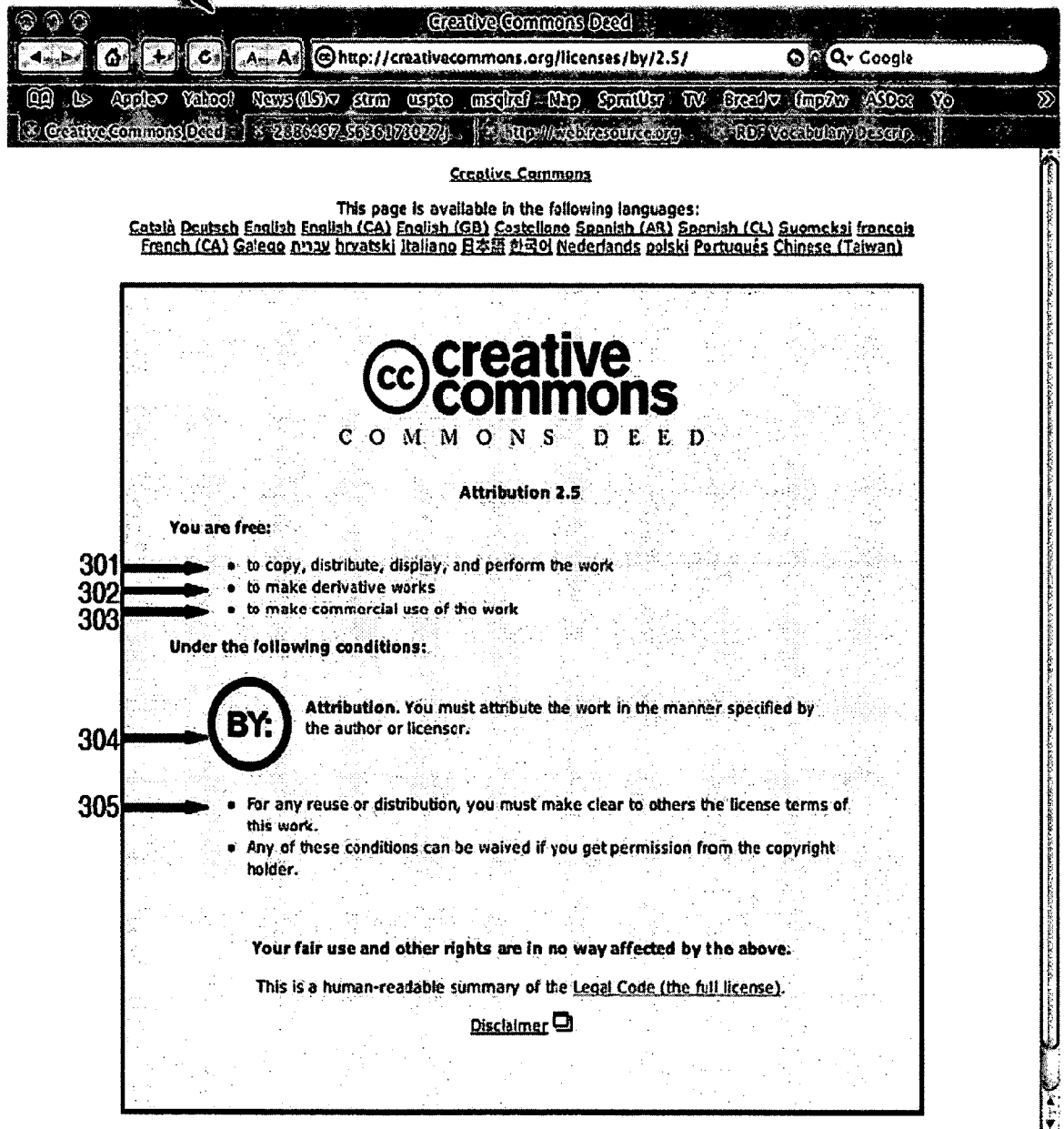
FIG. 3 is an exemplary license used in accordance with an embodiment of the present disclosure.

In one embodiment, once a media item portion entry from the results area 108 is selected, the user interface replaces the search results with detailed information as shown in 201 and 202 in the results area as depicted in FIG. 2. In other embodiments wherein the media item portion is an audio file the search result may be displayed as graphical image representing the audio file, accompanied by controls enabling the user to hear all or a sample of the audio file. Further, as depicted in FIG. 2, the user interface comprises an area 202 comprising information associated with the selected media item portion entry. In one embodiment, as depicted in FIG. 2, the information area 202 comprises commerce enabling information (as described herein) associated with the selected media item portion 201. In other embodiments, the associated information may comprise information other than commerce enabling information or a combination thereof. For example, in FIG. 2, the commerce enabling information comprises the identity 203 of the rights holder associated with the media item portion, the license terms 204 such as attribution associated with the media item portion, and the terms 205 such as price associated with the media item portion.

Of course further embodiments contemplate a user interface comprising any combination and number of areas in order to enable a user to search for and utilize multiple media item portions and associated information from a database. Thus, enabling an efficient and simple user interface to access a database useful in the composite media item marketplace.

Those skilled in the art will recognize that the method and system of the present invention within the application may be implemented in many manners and as such is not to be limited by the foregoing exemplary embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present invention covers conventionally known and features of those variations and modifications through the system component described herein as would be understood by those skilled in the art.

I claim:

1. A user interface visibly displayed to a user on a display comprising:
    a search entry area visibly displayed on the display for populating with a parameter associated with a desired media item portion, a media item portion being a portion or component of a media item and not the entire media item, said desired media item portion being associated with a media item portion entry accessed from a searchable media item portion database comprising media item portion metadata stored in accordance with a data container format, said media item portion metadata comprising commerce terms;
    a user input element for initiating a search of said media item portion database in accordance with said parameter;
    a first area for visibly displaying on the display a result of said search, said result comprising the media item portion metadata, said displayed metadata being displayed in a manner so as to translate some portion of said metadata in said data container format into user perceptible form and to display the commerce terms by which said media item portion may be utilized to form a composite media item with at least one other media item portion; and
    a second area for visibly displaying on the display filter parameters by which said metadata is filtered based on a type of the media item portion to affect which metadata is displayed.

2. The user interface of claim 1 wherein said search entry area comprises a text entry box.

3. The user interface of claim 1 wherein said search entry area comprises a drop-down menu from which parameters may be selected.

4. The user interface of claim 1 wherein said populated parameter comprises a title associated with said media item portion.

5. The user interface of claim 1 wherein said populated parameter comprises a format type associated with said media item portion.

6. The user interface of claim 1 wherein said populated parameter comprises the identity of a creator of said media item portion.

7. The user interface of claim 1 wherein said populated parameter comprises the identity of an owner of said media item portion.

8. The user interface of claim 1 wherein said populated parameter comprises a genre associated with said media item portion.

9. The user interface of claim 1 wherein said populated parameter comprises commerce enabling information associated with said media item portion.

10. The user interface of claim 1 wherein said user input element comprises a button.

11. The user interface of claim 1 wherein said displayed metadata comprise a title associated with said media item portion.

12. The user interface of claim 1 wherein said displayed metadata comprises a format type associated with said media item portion.

13. The user interface of claim 1 wherein said displayed metadata comprises a size associated with said media item portion.

14. The user interface of claim 1 wherein said displayed metadata comprises the identity of a creator of said media item portion.

15. The user interface of claim 1 wherein said displayed metadata comprises the identity of an owner of said media item portion.

16. The user interface of claim 1 wherein said displayed metadata is visibly displayed in said first area in a columnar format.

17. The user interface of claim 1 wherein said displayed metadata comprises a set of usage rights associated with said media item portion.

18. The user interface of claim 17 wherein said usage rights comprise a commercial designation indicating that said media item portion may be used for commercial purposes.

19. The user interface of claim 17 wherein said usage rights comprise a non-commercial designation indicating that said media item portion can only be used for non-commercial purposes.

20. The user interface of claim 1 wherein said displayed metadata identifies a licensing term associated with a media item portion.

21. The user interface of claim 20 wherein said licensing term comprises a price per copy of said media item portion.

22. The user interface of claim 1 wherein said displayed metadata comprises a genre associated with said media item portion.

23. The user interface of claim 1 wherein said displayed metadata comprises commerce enabling information.

24. The user interface of claim 1 wherein said filter parameters are visibly displayed as a categorical menu.

25. The user interface of claim 1 wherein said filter parameters comprise an audio file filter.

26. The user interface of claim 1 wherein said filter parameters comprise a video file filter.

27. The user interface of claim 1 wherein said filter parameters comprise an image file filter.

28. The user interface of claim 1 wherein said filter parameters comprise a text file filter.

29. The user interface of claim 1 wherein said filter parameters comprise a filter associated with visibly displaying in said first area only locally stored media item portions.

30. The user interface of claim 1 wherein said filter parameters comprise a filter associated with visibly displaying in said first area only media item portions accessible from said database.

31. The user interface of claim 1 further comprising a third area comprising a first interactable indicia representing a media item portion addition action for signaling a program to add said media item portion to a user's local media item portion library.

32. The user interface of claim 1 further comprising a third area comprising a first interactable indicia representing a media item portion bookmarking action, for signaling a program to create a reference associated with said media item portion on a user's local browser.

33. The user interface of claim 1 further comprising a third area for visibly displaying a graphical representation of a media item portion entry upon highlighting a result from said first area.

34. The user interface of claim 1 wherein upon selecting said result from said first area causes the display of a fourth area visibly displaying commerce enabling information with said media item portion.

35. The user interface of claim 34 wherein said fourth area comprises a subarea containing a portion of said commerce enabling information.

36. The user interface of claim 34 wherein said fourth area comprises a plurality of subareas each visibly displaying a portion of said commerce enabling information.

37. The user interface of claim 34 wherein said commerce enabling information comprises an attribution of a publisher.

38. The user interface of claim 34 wherein said commerce enabling information comprises a price per copy of said media item portion.

39. The user interface of claim 34 wherein said commerce enabling information comprises an identity of a rights holder.

40. The user interface of claim 34 wherein said commerce enabling information comprises a set of licensing terms.

41. The user interface of claim 34 wherein said commerce enabling information comprises a copyright message.

42. The user interface of claim 34 wherein said commerce enabling information comprises a digital rights message.

43. The user interface of claim 34 wherein said commerce enabling information comprises a pointer to a copyright message.

44. The user interface of claim 34 wherein said commerce enabling information comprises a pointer to licensing information.

45. The user interface of claim 1 wherein upon selecting said result from said first area, said first area visibly displays a graphical representation of said media item portion.

46. The user interface of claim 45 wherein said first area further visibly displays textual information associated with said media item portion.

* * * * *